United States Patent
Zimmerman, Jr.

(10) Patent No.: US 9,908,190 B1
(45) Date of Patent: Mar. 6, 2018

(54) ADJUSTABLE MATERIAL CONVEYOR

(71) Applicant: Dennis Edgar Zimmerman, Jr., Houston, TX (US)

(72) Inventor: Dennis Edgar Zimmerman, Jr., Houston, TX (US)

(73) Assignee: Tiber Holdings, LLC, Houston, TX (US)

( * ) Notice: Subject to any disclaimer, the term of this patent is extended or adjusted under 35 U.S.C. 154(b) by 0 days.

(21) Appl. No.: 15/677,619

(22) Filed: Aug. 15, 2017

Related U.S. Application Data (60) Provisional application No. 62/376,625, filed on Aug. 18, 2016.

(51) Int. Cl.
| | | |
|---|---|---|
| *B65G 19/00* | (2006.01) | |
| *B65G 21/00* | (2006.01) | |
| *B23D 47/02* | (2006.01) | |
| *B23Q 3/10* | (2006.01) | |
| *B23Q 3/18* | (2006.01) | |
| *B23D 47/04* | (2006.01) | |

(52) U.S. Cl.
CPC ......... *B23D 47/025* (2013.01); *B23D 47/042* (2013.01); *B23Q 3/105* (2013.01); *B23Q 3/186* (2013.01)

(58) Field of Classification Search
None
See application file for complete search history.

(56) References Cited

U.S. PATENT DOCUMENTS

| | | | | |
|---|---|---|---|---|
| 3,341,031 A | * | 9/1967 | Myers | B65B 35/50 193/44 |
| 3,513,956 A | * | 5/1970 | Rayment | B07B 13/16 193/44 |
| 8,365,904 B2 | * | 2/2013 | Morch | A23G 9/265 198/547 |

* cited by examiner

*Primary Examiner* — Kavel Singh
(74) *Attorney, Agent, or Firm* — Buskop Law Group, P.C.; Wendy Buskop

(57) ABSTRACT

A portable adjustable conveyor for use with a power tool for cutting a work piece. The portable adjustable conveyor has a one piece frame formed from a base plate integrally connected to first and second guide plates. Each guide plate has first, second and third groups of vertically aligned alignment holes oriented on a diagonal configuration to each other and spaced centrally in each guide plate. A removable roller engages between pairs of vertically aligned alignment holes in a first, second or third group of offset holes. The portable conveyer enables the power tool to process a work piece and reposition the work piece in less than 90 seconds repeatedly using different pairs of longitudinally aligned alignment holes with the removable roller as well as reduce static in the work place and increase lumens to the workpieces, all simultaneously.

18 Claims, 5 Drawing Sheets

ADJUSTABLE MATERIAL CONVEYOR

CROSS REFERENCE TO RELATED APPLICATIONS

The present application claims priority to and the benefit of U.S. Provisional Patent Application Ser. No. 62/376,625 filed on Aug. 18, 2016, entitled "Adjustable Material Conveyor". This reference is hereby incorporated in its entirety.

FIELD

The present embodiments generally relate to an adjustable materials guide for power tools such as portable saws.

BACKGROUND

A need exists for a portable adjustable conveyor which is easy to use, easy to carry and usable with a variety of widths of products for cutting, drilling and similar processing with a power tool.

A further need exists for an adjustable material guide that is detachable, self-aligning, and relocatable for use with a plurality of portable power tools at a job location.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present embodiments relate to an adjustable conveyor for use with a power tool for material handling of a work piece.

The portable adjustable conveyor prevents severe injuries, such loss of fingers or other body parts because it enables a user to push a work piece at least a few feet from the power tool with reduced friction and proper alignment, preventing the work piece from jumping or bouncing during processing.

The portable adjustable conveyor prevents waste of work piece material, reducing the carbon footprint of the user, by ensuring proper alignment, and reduced friction during processing.

The portable adjustable conveyor prevents a saw blade from running out of alignment which in turn prevents a saw blade from exploding which can remove an eye of a user, or cause a spark in the workplace and set sawdust on fire or a powder explosion.

The portable adjustable conveyor may be able to reduce insurance claims in a workplace by preventing magnesium based workpieces from catching on fire and burning due to incorrect alignment.

The portable adjustable conveyor will prevent work pieces from being shot out by the circular saw during cutting which in turn prevents the work pieces from hitting a person in the head, thereby preventing severe injuries, such as concussions or casualties of people using power tools.

The following terms will be used:

The term "base plate" refers to the plate connecting the guide plates. The base plate can be a polygonal shape, such as a rectangular shape or square shape.

The term "guide plate" refers to one of the two plates with offset holes used to support the removable roller in a variety of configurations to provide flexibility while operating a power tool on a work piece. The guide plates can be different shapes, such as polygonal, ellipsoid, or curvilinear.

The term "joining edge" refers to a weld edge, bent edge, formed edge, or cast edge that connects a guide plate to a base plate at an angle from 85 degrees to 95 degrees.

The term "outer edge" refers to one or more surfaces of the guide plate which are not the joining edge.

The term "vertically aligned alignment holes" refers to pairs of holes to support the roller. The holes can be positioned offset from one group to another group in the same guide plate.

The term "offset" refers to positioning of groups of holes. Specifically, a first hole of one group of alignment holes being at a preset angle, such as from one degree to twenty degrees and at a preset distance from a first hole of another alignment group in the same guide plate.

The term "graduated preset pattern" refers to the pattern created by an entire group of two or more offset vertically aligned alignment holes in a guide plate.

The term "removable roller" refers to a hand installable, hand removable roller that a can be installed easily without the need for tools or machinery with little pressure, such as one psi.

The term "power tool" refers to any of a group of power operated cutting, drilling, sanding, milling, lasering, etching, brazing, scoring, or the like. The power tools can be electrically operated. The power tools can be battery operated. The power tools or fueled by a hydrocarbon.

The term "retainer" is a device to hold the shaft within the bearings under the one piece rolling sheath.

A portable adjustable conveyor is for use with a power tool such as a band saw, for material handling of a work piece such as a 2'×4' (2 ft×4 ft) cut timber.

The portable adjustable conveyor has a one piece frame positionable proximate a power tool and in alignment with the power tool.

The one piece frame can have a first guide plate with a first joining edge and a first outer edge 43. The first guide plate can be polygonal, ellipsoid, or curvilinear in shape.

The first guide plate can have each of (i) a first group of vertically aligned alignment holes positioned with a first hole abutting the first joining edge, (ii) a second group of vertically aligned alignment holes positioned with a first hole abutting the first joining edge, and (iii) a third group of vertically aligned alignment holes 46a-d with a first hole positioned abutting the first joining edge.

The one piece frame can have a second guide plate with a second joining edge and a second outer edge. The second guide plate can be polygonal, ellipsoid, or curvilinear in shape.

The second guide plate can have each of (i) a first group of vertically aligned alignment holes positioned with a first hole abutting the second joining edge, (ii) a second group of vertically aligned alignment holes positioned with a first hole abutting the second joining edge, and (iii) a third group of vertically aligned alignment holes positioned with a first hole abutting the second joining edge.

Each second group of vertically aligned alignment holes is additionally offset from both the first group of vertically aligned alignment holes and the third group of vertically aligned alignment holes. The offset can be in fractions of an inch to more than one inch depending on the overall size of the guide plate.

Each hole of each first group of vertically aligned alignment holes of the first guide plate longitudinally aligns with matching holes of the first group of vertically aligned alignment holes of the second guide plate.

Each hole of each second group of vertically aligned alignment holes of the first guide plate longitudinally aligns with matching holes of the second group of vertically aligned alignment holes of the second guide plate.

Each hole of each third group of vertically aligned alignment holes of the first guide plate longitudinally aligns with matching holes of the third group of vertically aligned alignment holes of the second guide plate.

Each group of the vertically aligned alignment holes are arranged to be offset sequentially, in a graduated preset pattern, to provide maximum load support to a work piece.

The holes can be circular, but may have a different shape, as along as the holes of each group are identical, that is the shape of the holes of the first group of the first guide plate must match this shape of the holes of the first group of the second guide plate.

The groups of the vertically aligned alignment holes are grouped in a center section in each guide plate to provide increased stability to the workpiece by reducing friction to the one piece frame and preventing tipping.

The one piece frame includes a base plate, which can be a polygonal shape, such as a rectangular shape.

The base plate is integrally connected, such as by welding, to each guide plate at each guide plate's joining edges.

The first guide plate and second guide plate extend from the base plate 60 at an angle from 85 to 95 degrees.

The base plate has a thickness from 1/32 inch to one inch.

The portable adjustable conveyor has a removable roller engagable between two vertically aligned alignment holes which are either in: the first group of vertically aligned alignment holes, the second group of vertically aligned alignment holes or the third group of vertically aligned alignment holes, enabling the work piece to be (i) simultaneously horizontally and laterally aligned with the power tool, and (ii) simultaneously movable laterally with reduced friction toward the power tool without the need for additional supports, additional clamps, or additional alignment devices.

The portable adjustable conveyor enables the power tool to process the work piece in a short period of time, a matter of seconds, such as from 10 to 90 seconds by reducing friction of lateral movement of the workpiece while simultaneously providing an aligned workpiece with the power tool.

In embodiments, each of the first group of vertically aligned alignment holes is offset at an identical preset distance, and the identical preset distance is from 0.25 inches to one inch from the second group of vertically aligned alignment holes.

In embodiments, the first hole of the third group of vertically aligned alignment holes is offset from 0.125 inches to one inch from the first hole of the first group of vertically aligned alignment holes.

In embodiments, the removable roller has a one piece axle with a moveable retainer on one end of the axle and a fixed retainer on the other end of the axle. Each retainer can be disposed around the one piece axle.

The removable roller can have a spring disposed around the one piece axle between the movable retainer and the fixed retainer.

The removable roller can have a one piece rolling sheath disposed over the spring, the moveable retainer and the fixed retainer.

The one piece rolling sheath covers at least 90% of the one piece axle enabling the moveable retainer to slide within the one piece rolling sheath over the one piece axle.

The removable roller can have a first mounting means securing the one piece axle to the one piece rolling sheath and a second mounting means securing the one piece axle to the one piece rolling sheath opposite the first mounting means. The axle can be one-fourth inch to one-half inch in diameter and have the shape of a cylinder in an embodiment.

In embodiments, each pair of guide plates can have matching shapes, such as matching half circles, matching parallelograms, matching squares, matching rectangles, matching trapezoids, and matching isosceles triangles.

In embodiments wherein the pair of guide plates are parallelograms, each guide plate can have an uppermost edge opposite the base plate which is either planar and aligned with the base plate or rounded.

In embodiments, each guide plate is from 0.0625 inches to 0.5 inches in thickness.

In embodiments, the one piece frame can be made from an aluminum material, a carbon fiber material, or a steel material or combinations of these components.

In embodiments, the one piece frame is shaped a process which is either welding, casting, or bending.

In embodiments, a powder coating such as an anti-static coating or a paint, such as one to reduce corrosion can be used to encapsulate the one piece frame.

In embodiments, the powder coating or the paint can reflect light to increase lumens in the workplace by at least 10 percent.

In embodiments, the portable adjustable conveyor can have a total weight from one pound to five pounds.

In embodiments, each guide plate has a length and an uppermost edge 82a, 82b, and a portion of the vertically aligned alignment holes formed in each guide plate at a height location 83, from one percent to fifty percent of a total height of each guide plate as measured from each uppermost edge, enabling each removable roller to roll unimpeded from a plurality of locations between the guide plates while preventing the work piece from falling off the removable roller as the work piece is moved towards the power tool.

In embodiments, the first group of vertically aligned alignment holes are formed in each guide plate at a height location from one percent to fifty percent of a total height of each guide plate as measured from each joining edge, the second group of vertically aligned alignment holes are formed in each guide plate at a height location from 1 percent to 50 percent of a total height of each guide plate as measured from each joining edge, and the third group of vertically aligned alignment holes are formed in each guide plate at a height location from one percent to fifty percent of a total height of each guide plate as measured from each joining edge.

In embodiments, the first group of vertically aligned alignment holes and the third group of vertically aligned alignment holes are formed in each guide plate a distance from one percent to fifty percent of a width of each guide plate as measured from each outer edge of each guide plate.

In embodiments, the one piece rolling sheath of the moveable roller can be covered at least partially with a polyurethane coating for reduction of static build up and provision of impact protection for workpieces.

In embodiments, each base plate can have the shape of a squares or a rectangle.

Figures 1A, 1B:
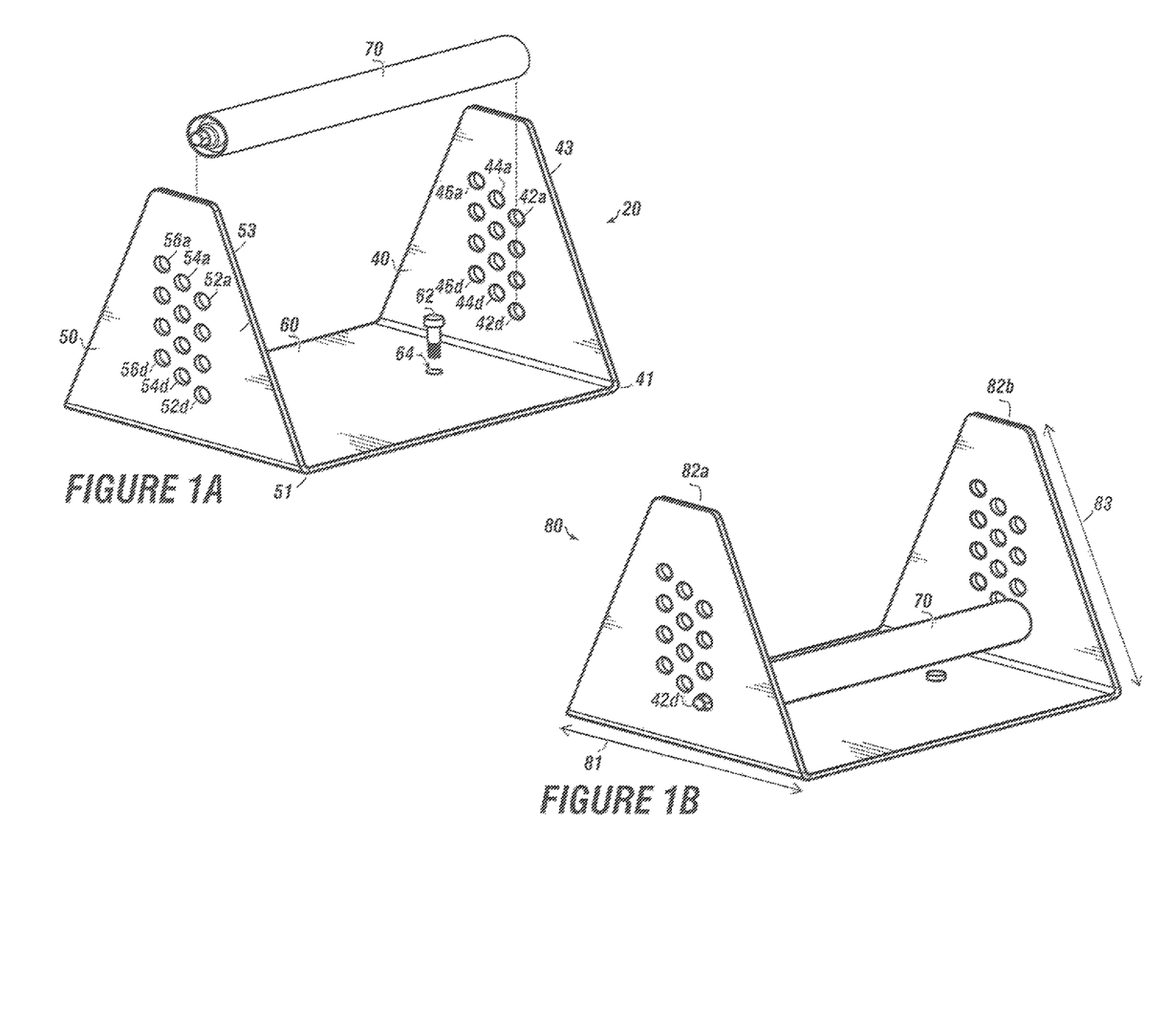
FIGS. 1A and 1B depict a portable adjustable conveyor according to one or more embodiments.

Turning now to the Figures, FIGS. 1A and 1B depict a portable adjustable conveyor according to one or more embodiments.

The portable adjustable conveyor 80 aligns with a power tool for simultaneous ease of material handling of a work piece and reduction of friction.

The portable adjustable conveyor has a one piece frame 20 positionable proximate and in alignment with the operating mechanism of a power tool.

The portable adjustable conveyor can be used for simultaneously (i) elevating and (ii) aligning a work piece to perfectly match to a horizontal cutting surface, a drilling surface, or a sanding surface of the power tool.

This perfect match of alignment is a significant feature of the invention. The invention not only perfectly matches, but provides reduced friction due to its unique combinations of relocatable adjustable removeable roller and the alignment holes created in portions of the one piece frame.

The one piece frame 20 can have a first guide plate 40, which can have a first group of vertically aligned alignment holes 42a-42d, a second group of vertically aligned alignment holes 44a-44d, and a third group of vertically aligned alignment holes 46a-46d.

The first guide plate 40 has a first joining edge 41 and a first outer edge 43.

The one piece frame 20 can have a second guide plate 50, which can have a first group of vertically aligned alignment holes 52a-52d, a second group of vertically aligned alignment holes 54a-54d, and a third group of vertically aligned alignment holes 56a-56d.

The second guide plate 50 has a second joining edge 51 and a second outer edge 53.

In embodiments, each guide plate can be a polygonal, ellipsoid, or curvilinear in shape. Each guide plate can have an uppermost edge 82a, 82b opposite the base plate.

Each second group of vertically aligned alignment holes can be offset from both the first group of vertically aligned alignment holes and the third group of vertically aligned alignment holes.

Each group of vertically aligned alignment holes can be offset diagonally from another group by one-fourth inch and up to one inch.

A graduated preset pattern of holes is formed centrally located in each guide plate to provide maximum load support to a work piece as the work piece slides over a removable roller mounted between a pair of vertically aligned alignment holes from the same group of holes.

The vertically aligned alignment holes can be centered in each guide plate to provide maximum stability to the one piece frame preventing tipping of the one piece frame.

Each of the first group of vertically aligned alignment holes can be offset at an identical preset distance. The identical preset distance can range from one-fourth inch to one inch from the second group of vertically aligned alignment holes.

The first hole of the third group of vertically aligned alignment holes can be offset from 0.125 inch to 1 inch from the first hole of the first group of vertically aligned alignment holes on a diagonal orientation.

In embodiments, each first group of vertically aligned alignment holes 42a-42d and 52a-52d can longitudinally align with each other.

In embodiments, each second group of vertically aligned alignment holes 44a-44d and 54a-54d can longitudinally align with each other.

In embodiments, each third group of vertically aligned alignment holes 46a-46d and 56a-56d can longitudinally align with each other.

In embodiments, the first group of vertically aligned alignment holes can be offset from one-fourth inch to 1 inch from the second group of vertically aligned alignment holes and from one inch to four inches from the first hole of the third group of vertically aligned alignment holes each group of holes being in a diagonal orientation to another group of holes.

Each group of vertically aligned alignment holes can be positioned centrally on each guide plate.

The vertically aligned alignment holes can each have identical diameters. The identical diameters can range from 0.125 inch to 0.5 inch.

The first and second guide plates can each have a length, the length 81 is shown in the second guide plate in these two Figures.

The first guide plate can have an identical length to the second guide plate.

In embodiments, the length of each guide plate can range from five inches to twenty-four inches.

In embodiments, the first and second guide plates can have different lengths.

A base plate 60 can be integrally connected to each first and second guide plate 40, 50 at an angle from 85 degrees to 95 degrees forming the one piece frame 20.

The first guide plate 40 and the second guide plate 50 can each extend from the base plate 60 in parallel.

The base plate 60 can be affixed to another surface with at least one fastener 62 penetrating a base plate hole 64.

The base plate can have a length from three inches to twenty-five inches, such as four inches, five inches or six inches.

The base plate can have a width from to three inches to twenty-five inches, such a eight inches or nine inches.

A removable roller 70 can be engagable between two vertically aligned alignment holes in the first group, the second group or the third group of vertically aligned alignment holes enabling the work piece to be suspended above the rectangular frame.

The removable roller 70 can have a stiffness and load bearing physical property to withstand the weight of twenty pound to fifty pound work pieces without deforming.

The vertically aligned alignment holes can have sufficient space between them to enable the guide plate to withstand load presented by the removable roller without deforming or bending.

The orientation of the removable roller 70 can enable simultaneous horizontal and lateral alignment with the power tool and reduced friction for lateral movement of the work piece toward the power tool without the need for additional supports, clamps or alignment devices.

The base plate can have a length from four inches to twenty-four inches and a width from four inches to ten inches.

In embodiments, the first guide plate 40 and the second guide plate 50 can be generally polygonal, ellipsoid, or curvilinear.

In embodiments, the first guide plate can have a different shape from the second guide so long as the alignment holes can be positioned centrally and in longitudinal alignment with each other.

In embodiments, each guide plate can be from 0.0625 inches to 0.5 inches in thickness.

In embodiments, the portable adjustable conveyor can have a powder coating 19 or paint 21 encapsulating the one piece frame 20.

The powder coating or paint can be reflective of light to increase lumens in the workplace by at least 10 percent.

This increase in light in the workplace is a significant improvement in safety for workers using saws to prevent severe injury to hands due to bad lighting.

The improved lighting is of an increase of five to thirty lumens helps keep the worker safer than known devices.

A removable roller 70 can be engaged between pairs of vertically aligned alignment holes in each first group such as between vertically aligned alignment holes 42a-42d and vertically aligned alignment holes 52a-52d.

The removable roller 70 can be engaged between pairs of vertically aligned alignment holes in each second group, such as between vertically aligned alignment holes 44a-44d and vertically aligned alignment holes 54a-54d.

The removable roller 70 can be engaged between pairs of vertically aligned alignment holes in each third group, such as between vertically aligned alignment holes 46a-46d and such as between vertically aligned alignment holes 56a-56d of vertically aligned alignment holes enabling a work piece to be horizontally aligned with the power tool without the need for additional supports, clamps or alignment devices.

FIG. 1B shows the removable roller penetrating one of the holes of each first group of vertically aligned alignment holes 42d and 52d (not shown in FIG. 1B) simultaneously.

In embodiments, roller can be positioned at a distance that is fifteen percent of the length of each guide plate as measured from each uppermost edge for each first hole of each group, enabling each removable roller to not only be repositionable but also to roll unimpeded from a plurality of locations between the guide plates while preventing the work piece from falling off the removable roller as the work piece is moved in precise alignment towards the horizontal surfaces of a power tool.

The removable roller 70 can have a diameter from 0.25 inches to 2 inches.

Figure 2A:
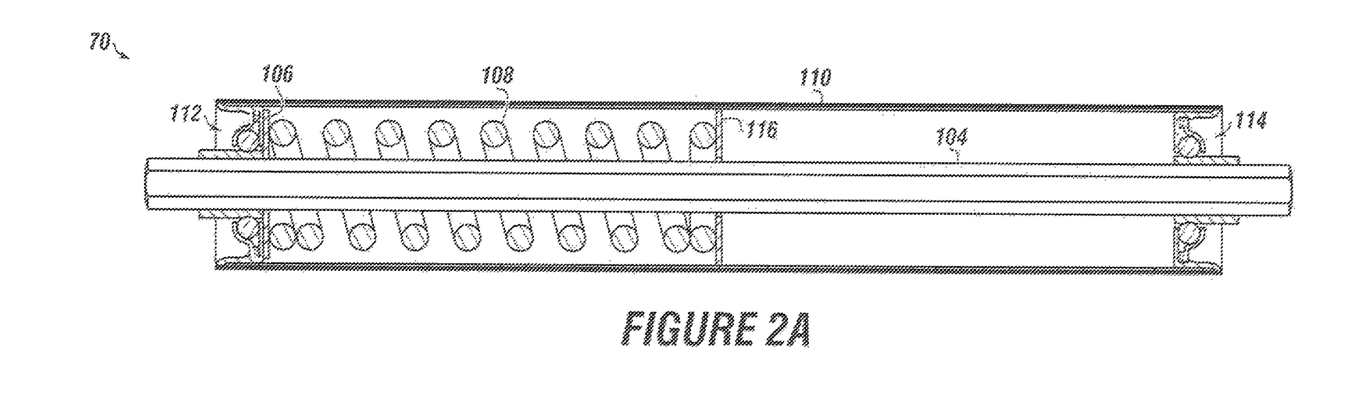
FIGS. 2A and 2B depict a cut view of the removable roller according to one or more embodiments.
Figure 2B:
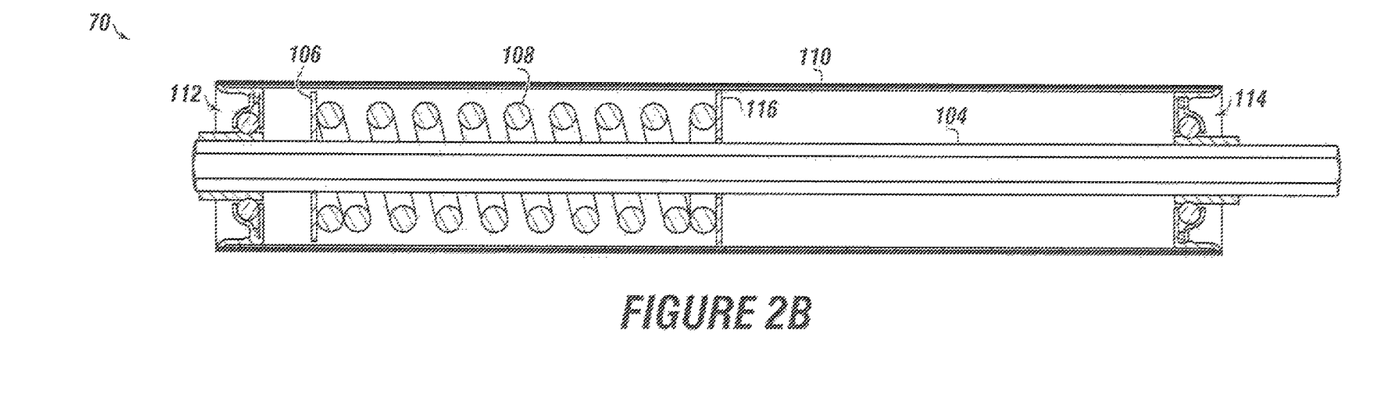

FIGS. 2A and 2B depict a cut view of the removable roller according to one or more embodiments.

The removable roller 70 can have a one piece axle 104, a moveable retainer 106 and a fixed retainer 116, which can be disposed around the one piece axle 104.

In embodiments, a spring 108 can be disposed around the one piece axle 104 and held between the moveable retainer 106 and the fixed retainer 116.

A one piece rolling sheath 110 can be disposed over the spring 108, the moveable retainer 106 and the fixed retainer 116 covering at least 80 percent of the one piece axle.

A first mounting means 112 can secure the one piece axle to the one piece rolling sheath.

A second mounting means 114 can secure the one piece axle to the one piece rolling sheath opposite the first mounting means 112.

The one piece rolling sheath can have a polyurethane coating for reduction of static build up and provision of impact protection for workpieces.

The portable adjustable conveyor enables the power tool to process the work piece in from ten seconds to ninety seconds by reducing friction of lateral movement and providing an aligned work piece with the power tool.

In embodiments, the portable adjustable conveyor 80 enables the power tool to process the work piece in a time window from ten seconds to ninety seconds, repeatedly using different pairs of longitudinally aligned alignment holes with the removable roller.

FIGS. 3A-D depict different shapes of guide plate for the one piece frame.

Figures 3A, 3B:
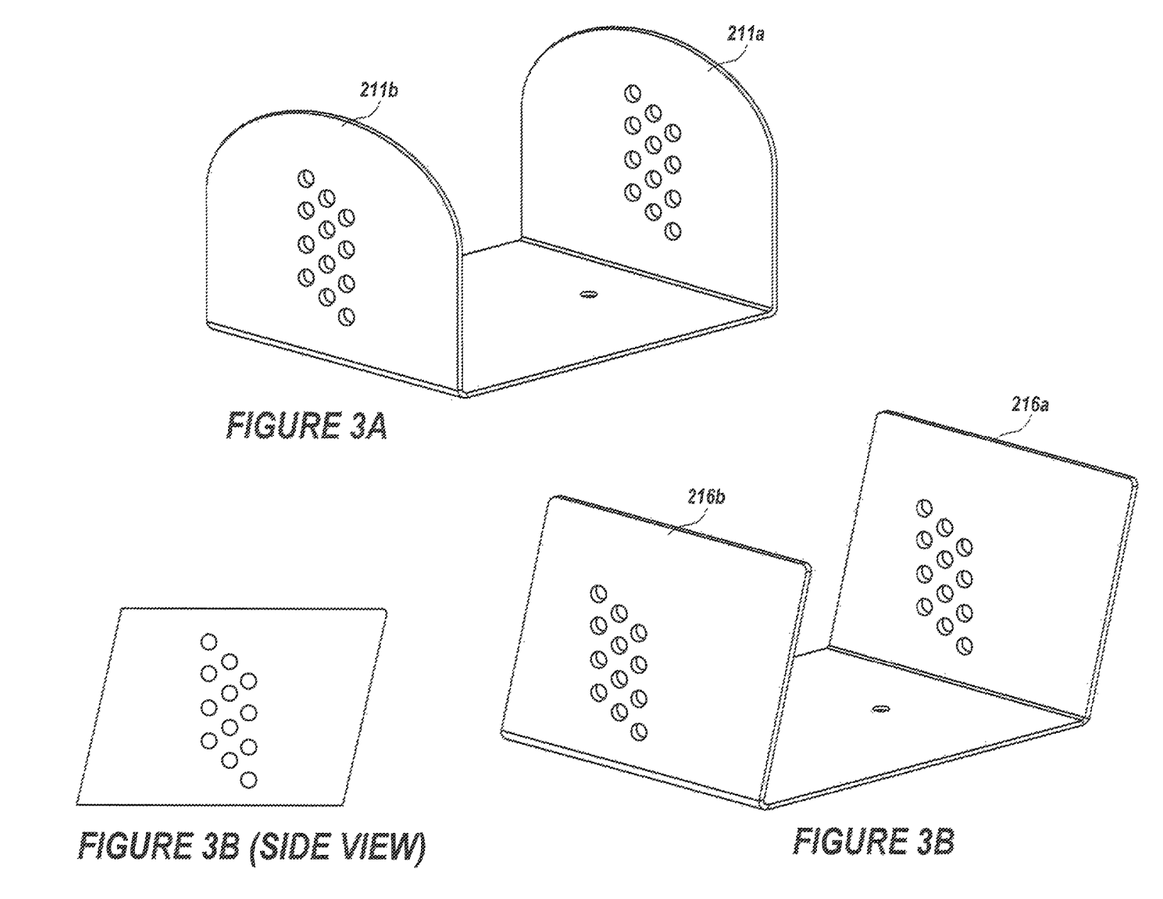
FIG. 3A shows a pair of matching half circles 211a and 211b as the guide plate according to one or more embodiments.
FIG. 3B shows a pair of matching parallelograms 210a and 210b as the guide plate according to one or more embodiments.

FIG. 3A shows a pair of matching semicircles 211a and 211b as the guide plate.

FIG. 3B shows a pair of matching parallelograms 210a and 210b as the guide plate.

Figure 3C:
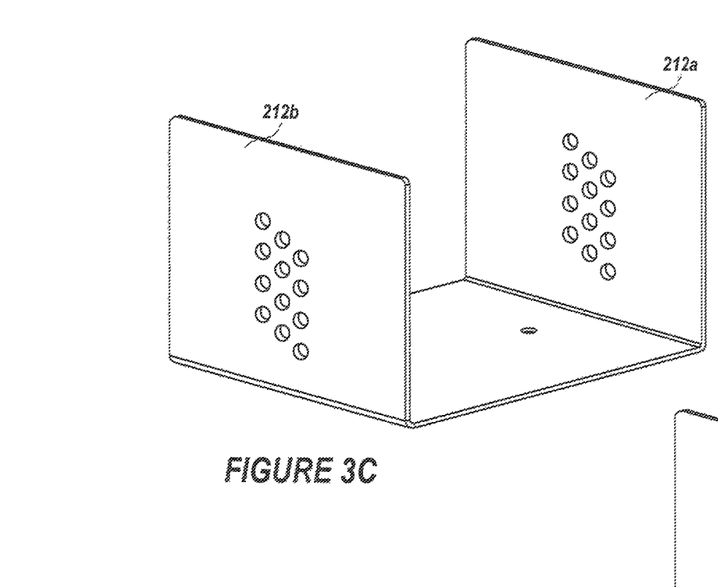
FIG. 3C shows a pair of matching squares 212a and 212b as the guide plate with base plate 60 that is a square in shape according to one or more embodiments.

FIG. 3C shows a pair of matching squares 212a and 212b as the guide plate with base plate 60 that is a square in shape.

Figure 3D:
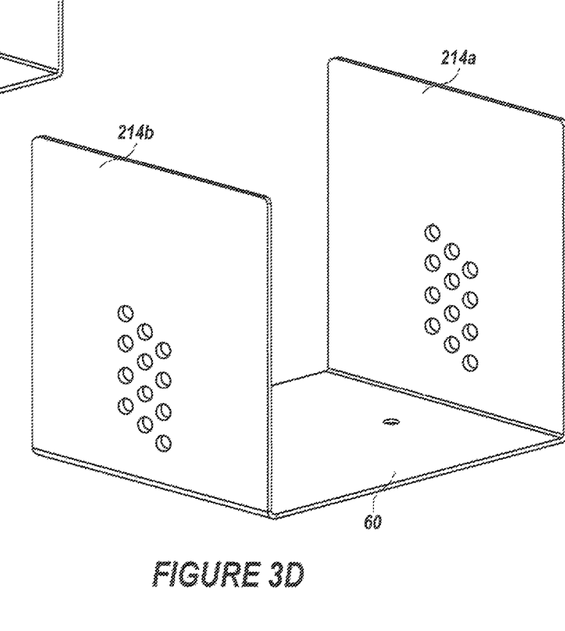
FIG. 3D shows a pair of matching rectangles 214a and 214b as the guide plate according to one or more embodiments.

FIG. 3D shows a pair of matching rectangles 214a and 214b as the guide plate.

Figures 3E, 3F:
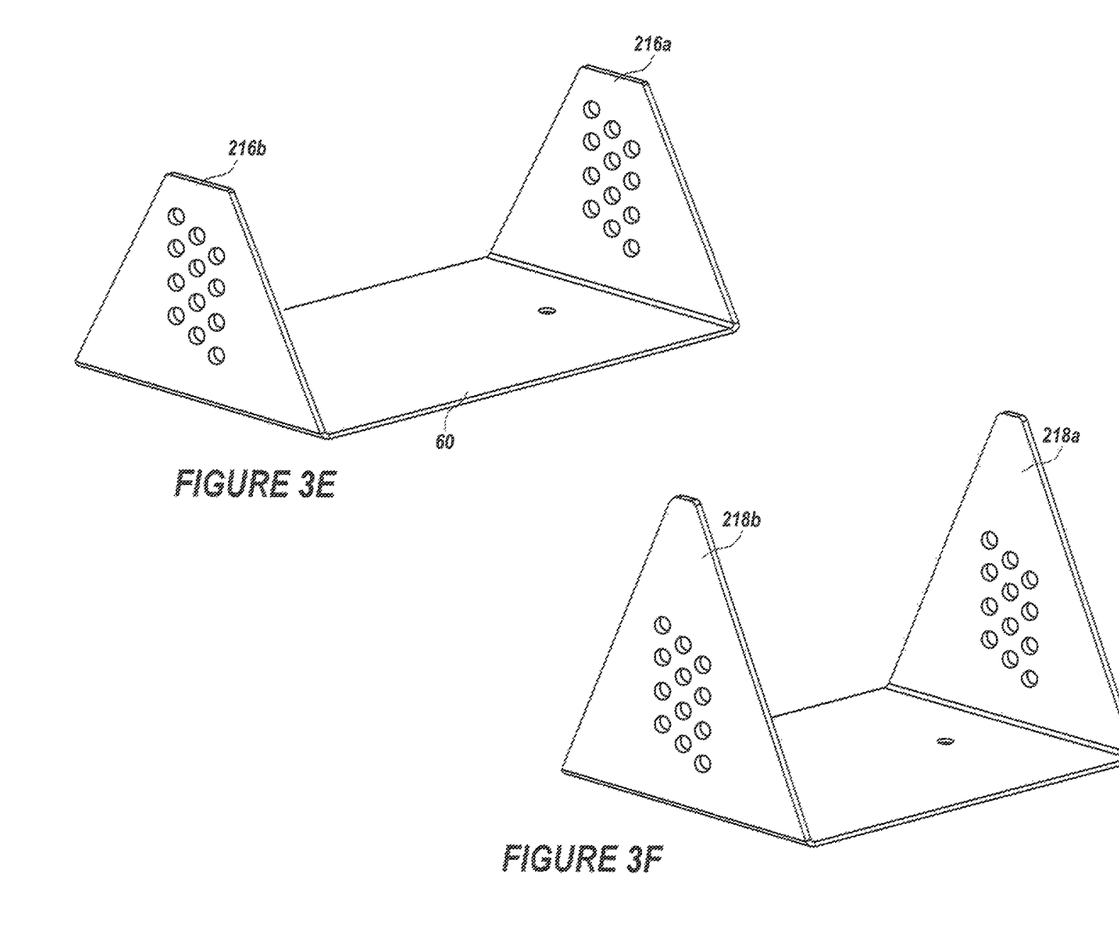
FIG. 3E shows a pair of matching trapezoids 216a and 216b as the guide plate with base plate 60 that is a rectangular in shape according to one or more embodiments.
FIG. 3F shows a pair of matching isosceles triangles 218a and 218b as the guide plate according to one or more embodiments.

FIG. 3E shows a pair of matching trapezoids 216a and 216b as the guide plate with base plate 60 that is a rectangular in shape.

FIG. 3F shows a pair of matching isosceles triangles 218a and 218b as the guide plate.

The invention includes a method of using a portable adjustable conveyor with a power tool for processing a work piece.

The method can include positioning a one piece frame adjacent a power tool.

The method can include installing a removable roller between two of the vertically aligned alignment holes in a first group, second group or third group forming the portable adjustable conveyor.

The method can include elevating and aligning the work piece with a horizontal surface of the power tool using the portable adjustable conveyor, and repositioning the work piece vertically in less than ninety seconds repeatedly using different pairs of longitudinally aligned alignment holes, and relocating the removable roller.

The method can include affixing the base plate to a surface with at least one fastener penetrating a base plate hole.

Example 1

A portable adjustable conveyor can be made out of steel for use with a circular saw for moving and positioning a fence post for cutting.

The portable adjustable conveyor is made up of a one piece frame that that has a first guide plate, which is 6 inches tall by ⅛ inch wide and 6 inches long.

The shape of the first guide plate is an isosceles trapezoid with a first outer edge that has three sides and is about 13 inches long.

A first group of four vertically aligned alignment holes 42a-42d, wherein each vertically aligned alignment hole has a diameter of ⅜ inches are positioned with a hole 42d positioned one inch from the first joining edge 41.

A second group of four vertically aligned alignment holes 44a-d, wherein each vertically aligned alignment hole has a diameter that is identical to the first group of vertically aligned alignment holes, is positioned with a hole 44d positioned 1¼ inches from the first joining edge 41.

A third group of four vertically aligned alignment holes 46a-d, wherein each vertically aligned alignment hole has a diameter that is identical to the first group of vertically aligned alignment holes, is positioned with a hole 46d positioned 1½ inches from the first joining edge 41.

A second guide plate, identical in size and shape to the first guide plate and made from the same material, is used having identical vertically aligned alignment holes.

Each second group of vertically aligned alignment holes is additionally offset from both the first group of vertically aligned alignment holes by ¼ inch.

Each third group of vertically aligned alignment holes is additionally offset from the second group of vertically aligned alignment holes by ¼ inch.

Each first group of vertically aligned alignment holes longitudinally aligns with each other, each second group of vertically aligned alignment holes longitudinally aligns with each other, and each third group of vertically aligned alignment holes longitudinally aligns with each other; that is, if a straight line were drawn from the top hole of the first group of vertically aligned alignment holes to the bottom hole, the line would intersect with each hole at the same location.

The vertically aligned alignment holes are arranged in a graduated preset pattern to provide maximum load support to a work piece and wherein the vertically aligned alignment holes are centered in each guide plate to provide maximum stability to the one piece frame preventing tipping.

In this example, the graduated preset pattern is a pattern that increases in height incrementally by ¼ inch.

A base plate that is 8 inches long and 6 inches wide in the shape of a rectangle, made from ⅛ inch thick steel plate, integrally connects with both guide plates at the guide plates's respective joining edges.

The first and second guide plates, each extend from the base plate at an angle of 90 degrees.

A spring loaded removable roller that is 7⅞ inches long is engagable between two vertically aligned alignment holes in either the first group, the second group or the third group of vertically aligned alignment holes enabling the work piece to be both (i) simultaneously horizontally and laterally aligned with a circular saw, and (ii) movable laterally with reduced friction approaching 80 percent to 90 percent compared to a flat surface directed toward the circular saw, all without the need for additional supports, clamps, or alignment devices.

In this example, the removable roller has a one piece axle made out of a cylinder of solid steel.

A moveable retainer similar to a steel washer surrounds the one piece axle.

A fixed retainer is disposed around the one piece axle opposite the moveable retainer and is made from steel that can be ¹⁄₃₂ inch thick.

A metal spring is disposed around the one piece axle between the moveable retainer and the fixed retainer. The metal spring is capable of providing 1 psi to 5 psi.

A one piece rolling sheath of steel with a thickness of ¹⁄₃₂ inch is disposed over the spring, the moveable retainer and fixed retainer.

One piece rolling sheath covers at least 90 percent of the one piece axle enabling the moveable retainer to slide within the one piece rolling sheath enabling the one piece axle to fit into the holes of the guide plates.

A first mounting means, which can be a roller bearing, such as a ball bearing can be used to secure the one piece axle to the one piece rolling sheath.

A second mounting means which in this example is a roller bearing identical to the first mounting means secures the one piece axle to the one piece rolling sheath opposite the first mounting means.

The portable adjustable conveyor enables the circular saw to process the work piece in from 10 seconds to 90 seconds by reducing friction of lateral movement and providing an aligned workpiece with the power tool.

Example 2

A portable adjustable conveyor made out of cast iron for use with a bandsaw for moving and positioning square tubing for cutting.

The portable adjustable conveyor is made up of a one piece frame that that has a first guide plate 9 inches tall by ¼ inch wide and 9 inches long.

The shape of the first guide plate is a square with a first outer edge that has three sides and is about 27 inches long.

A first group of four vertically aligned alignment holes 42a-42d, wherein each vertically aligned alignment hole has a diameter of ½ inch, are positioned with a hole positioned ¾ inch from the first joining edge 41.

A second group of four vertically aligned alignment holes 44a-d, wherein each second group of four vertically aligned alignment holes has a diameter that is identical to the first group of vertically aligned alignment holes are positioned with a hole 44d that is one inch from the first joining edge 41.

A third group of four vertically aligned alignment holes 46a-d each third group of four vertically aligned alignment holes has a diameter that is identical to the first group of vertically aligned alignment holes are positioned with a hole 46d that is 1¼ inches from the first joining edge 41.

A second guide plate identical in size and square shape to the first guide plate and made from the same material is used having identical vertically aligned alignment holes.

Each second group of vertically aligned alignment holes is additionally offset from both the first group of vertically aligned alignment holes by one inch.

Each third group of vertically aligned alignment holes is additionally offset from the second group of vertically aligned alignment holes by inch.

Each first group of vertically aligned alignment holes longitudinally aligns with each other, each second group of vertically aligned alignment holes longitudinally aligns with each other, and each third group of vertically aligned alignment holes longitudinally aligns with each other; that is, if a straight line were drawn from the top hole of the first group of vertically aligned alignment holes to the bottom hole, the line would intersect with each hole at the same location.

The vertically aligned alignment holes are arranged in a graduated preset pattern to provide maximum load support to a work piece and wherein the vertically aligned alignment holes are centered in each guide plate to provide maximum stability to the one piece frame preventing tipping.

In this example, the graduated preset pattern is a pattern that increases in height incrementally by ¼ inch.

A base plate that is 9 inches long and 6 inches wide in the shape of a rectangle, made from ¼ inch thick cast iron, integrally connects with both guide plates at the guide plates's respective joining edges.

The first and second guide plates extend from the base plate and form an angle of 85 degrees.

A spring loaded removable roller that is 8½ inches long is engagable between two vertically aligned alignment holes in either the first group, the second group or the third group of vertically aligned alignment holes enabling the work piece to be (i) simultaneously horizontally and laterally aligned with a circular saw and (ii) movable laterally with reduced friction approaching 80 percent to 90 percent compared to flat surface toward the bandsaw without the need for additional supports, clamps, or alignment devices.

In this example, the removable roller has a one piece axle made out of a cylinder of steel.

A moveable retainer similar to a steel washer surrounding the axle.

A fixed retainer is disposed around the one piece axle and is made from plastic that can be 1/64 inch thick.

A metal spring is disposed around the one piece axle between the moveable retainer and the fixed retainer. The metal spring is capable of providing 5 psi to 10 psi.

A one piece rolling sheath of steel with a thickness of 1/64 inch is disposed over the spring, the moveable retainer and fixed retainer.

One piece rolling sheath covers at least 80 percent of the one piece axle enabling the moveable retainer to slide within the one piece rolling sheath, enabling the axle to fit into the holes of the guide plates.

A first mounting means, which can be a bushing made of brass, can be used to secure the one piece axle to the one piece rolling sheath.

A second mounting means, which in this example is a brass bushing identical to the first mounting means, secures the one piece axle to the one piece rolling sheath opposite the first mounting means.

The portable adjustable conveyor enables the bandsaw to process the work piece in from 5 seconds to 60 seconds by reducing friction of lateral movement and providing an aligned workpiece with the power tool.

Example 3

A portable adjustable conveyor made out of aluminum for use with a drill press for moving and positioning a 2×4 piece of wood for drilling.

The portable adjustable conveyor is made up of a one piece frame that that has a first guide plate, which is 4 inches tall by 3/16 wide and 9 inches long.

The shape of the first guide plate is a semicircle with a first outer edge that has three sides and is about 15 inches long.

A first group of four vertically aligned alignment holes 42a-42d, wherein each vertically aligned alignment hole has a diameter of 5/16 inches, are positioned with a hole 42d positioned ½ inch from the first joining edge 41.

A second group of four vertically aligned alignment holes 44a-d, wherein each second group of vertically aligned alignment holes has a diameter that is identical to the first group of vertically aligned alignment holes are positioned with a hole 44d positioned 5/8 inch from the first joining edge 41.

A third group of four vertically aligned alignment holes 46a-d, wherein each third group of vertically aligned alignment holes has a diameter that is identical to the first group of vertically aligned alignment holes are positioned with a hole 46d positioned ¾ inch from the first joining edge 41.

A second guide plate identical in size and shape to the first guide plate and made from the same material is used having identical vertically aligned alignment holes.

Each second group of vertically aligned alignment holes is additionally offset from both the first group of vertically aligned alignment holes by ½ inch.

Each third group of vertically aligned alignment holes is additionally offset from the second group of vertically aligned alignment holes by ½ inch.

Each first group of vertically aligned alignment holes longitudinally aligns with each other, each second group of vertically aligned alignment holes longitudinally aligns with each other, and each third group of vertically aligned alignment holes longitudinally aligns with each other; that is, if a straight line were drawn from the top hole of the first group of vertically aligned alignment holes to the bottom hole, the line would intersect with each hole at the same location.

The vertically aligned alignment holes are arranged in a graduated preset pattern to provide maximum load support to a work piece, wherein the vertically aligned alignment holes are centered in each guide plate to provide maximum stability to the one piece frame preventing tipping.

In this example, the graduated preset pattern is a pattern that increases in height incrementally by ⅛ inch.

A base plate is 5 inches long and 9 inches wide in the shape of a rectangle, made from ¼ inch thick carbon fiber plate. The base plate integrally connects with both guide plates at the guide plates's respective joining edges.

The first and second guide plates extend from the base plate and form an angle of 95 degrees.

A spring loaded removable roller that is 4½ inches long is engagable between two vertically aligned alignment holes in either the first group, the second group or the third group of vertically aligned alignment holes enabling the work piece to be (i) simultaneously horizontally and laterally aligned with a circular saw, and (ii) movable laterally with reduced friction approaching 80 percent to 90 percent compared to flat surface toward the drill press without the need for additional supports, clamps, or alignment devices.

In this example, the removable roller has a one piece axle made out of round solid steel.

A moveable retainer similar to a steel washer surrounds the axle.

A fixed retainer is disposed around the one piece axle and is made from brass that can be 3/32 inch thick.

A metal spring is disposed around the one piece axle between the moveable retainer and the fixed retainer. The metal spring is capable of providing 1 psi to 3 psi.

A one piece rolling sheath of rubber coated steel with a thickness of ⅛ inch is disposed over the spring, the moveable retainer and fixed retainer.

The one piece rolling sheath covers at least 80 percent of the one piece axle enabling the moveable retainer to slide within the one piece rolling sheath enabling the one piece axle to fit into the holes of the guide plates.

A first mounting means which can be a plastic bushing can be used to secure the one piece axle to the one piece rolling sheath.

A second mounting means, which in this example is a plastic bushing identical to the first mounting means, secures the one piece axle to the one piece rolling sheath opposite the first mounting mean.

The portable adjustable conveyor enables the drill press to process the work piece in from 5 seconds to 60 seconds by reducing friction of lateral movement and providing an aligned workpiece with the power tool.

While these embodiments have been described with emphasis on the embodiments, it should be understood that within the scope of the appended claims, the embodiments might be practiced other than as specifically described herein.

What is claimed is:

1. A portable adjustable conveyor for use with a power tool for material handling of a work piece, the portable adjustable conveyor comprising:
   a. a one piece frame positionable proximate and in alignment with a power tool, the one piece frame comprising:
      (i) a first guide plate with a first joining edge and a first outer edge; the first guide plate having a first group of vertically aligned alignment holes positioned with a first hole abutting the first joining edge, a second group of vertically aligned alignment holes positioned with a first hole abutting the first joining edge, and a third group of vertically aligned alignment holes with a first hole positioned abutting the first joining edge;
      (ii) a second guide plate with a second joining edge and a second outer edge; the second guide plate having a first group of vertically aligned alignment holes positioned with a first hole abutting the second joining edge, a second group of vertically aligned alignment holes positioned with a first hole abutting the second joining edge, and a third group of vertically aligned alignment holes positioned with a first hole abutting the second joining edge;
         wherein each second group of vertically aligned alignment holes is additionally offset from both the first group of vertically aligned alignment holes and the third group of vertically aligned alignment holes, and wherein each first group of vertically aligned alignment holes longitudinally aligns with each other, each second group of vertically aligned alignment holes longitudinally aligns with each other, and each third group of vertically aligned alignment holes longitudinally aligns with each other, wherein the vertically aligned alignment holes are arranged in a graduated preset pattern to provide maximum load support to a work piece and the vertically aligned alignment holes are centered in each guide plate to provide increased stability by reducing friction to the one piece frame and preventing tipping;
      (iii) a base plate integrally connected to each guide plate at the respective joining edges, wherein the first and second guide plates extend from the base plate at an angle from 85 degrees to 95 degrees, and the base plate has a thickness from $\frac{1}{32}$ inch to 1 inch; and
   b. a removable roller engagable between two vertically aligned alignment holes in either: the first group, the second group or the third group of vertically aligned alignment holes, enabling the work piece to be:
      (i) simultaneously horizontally and laterally aligned with the power tool, and
      (ii) movable laterally with reduced friction toward the power tool without the need for additional supports, additional clamps, or additional alignment devices, and wherein the portable adjustable conveyor enables the power tool to process the work piece in from 5 seconds to 90 seconds by reducing friction of lateral movement and providing an aligned workpiece with the power tool.

2. The portable adjustable conveyor of claim 1, wherein each of the first group of vertically aligned alignment holes is offset an identical preset distance, and the identical preset distance is 0.25 inches to 1 inch from the second group of vertically aligned alignment holes.

3. The portable adjustable conveyor of claim 2, wherein the first hole of the third group of vertically aligned alignment holes is offset from 0.125 inches to 1 inch from the first hole of the first group of vertically aligned alignment holes.

4. The portable adjustable conveyor of claim 1, wherein the removable roller comprises:
   (i) a one piece axle;
   (ii) a moveable retainer and a fixed retainer, each disposed around the one piece axle;
   (iii) a spring disposed around the one piece axle between the movable moveable retainer and the fixed retainer;
   (iv) a one piece rolling sheath disposed over the spring, the moveable retainer and the fixed retainer, one piece rolling sheath covering at least 90 percent of the one piece axle enabling the moveable retainer to slide within the one piece rolling sheath;
   (v) a first mounting means securing the one piece axle to the one piece rolling sheath; and
   (vi) a second mounting means securing the one piece axle to the one piece rolling sheath opposite the first mounting means.

5. The portable adjustable conveyor of claim 1, wherein each guide plate is in the shape of a pair of matching half circles.

6. The portable adjustable conveyor of claim 1, wherein each guide plate is a shape of at least one pair of matching parallelograms, squares, rectangles, trapezoids, and isosceles triangles.

7. The portable adjustable conveyor of claim 1, wherein each guide plate has an uppermost edge opposite the base plate that is either planar and aligned with the base plate or rounded.

8. The portable adjustable conveyor of claim 1, wherein each guide plate is from 0.0625 inches to 0.5 inches in thickness.

9. The portable adjustable conveyor of claim 1, wherein the one piece frame comprises at least one of: an aluminum, a carbon fiber, or a steel.

10. The portable adjustable conveyor of claim 1, wherein the one piece frame is forming by welding, casting, or bending.

11. The portable adjustable conveyor of claim 8, further comprising a powder coating or a paint encapsulating the one piece frame.

12. The portable adjustable conveyor of claim 11, wherein the powder coating or the paint reflects light to increase lumens in the workplace by at least 10 percent.

13. The portable adjustable conveyor of claim 1, wherein the portable adjustable conveyor has a total weight from 1 pound to 5 pounds.

14. The portable adjustable conveyor of claim 6, wherein each guide plate has a length and an uppermost edge and a portion of the vertically aligned alignment holes formed in each guide plate at a height location, from 1 percent to 50 percent of a total height of each guide plate as measured from each uppermost edge, enabling each removable roller to roll unimpeded from a plurality of locations between the guide plates while preventing the work piece from falling off the removable roller as the work piece is moved towards the power tool.

15. The portable adjustable conveyor of claim 1, wherein the first group of vertically aligned alignment holes are formed in each guide plate at a height location from 1 percent to 50 percent of a total height of each guide plate as measured from each joining edge, the second group of vertically aligned alignment holes are formed in each guide plate at a height location from 1 percent to 50 percent of a total height of each guide plate as measured from each joining edge, and the third group of vertically aligned alignment holes are formed in each guide plate at a height location from 1 percent to 50 percent of a total height of each guide plate as measured from each joining edge.

16. The portable adjustable conveyor of claim 1, wherein the first and third group of vertically aligned alignment holes are formed in each guide plate a distance from 1 percent to 50 percent a width from each outer edge of each guide plate as measured from each outer edge of each guide plate.

17. The portable adjustable conveyor of claim 1, wherein the one piece rolling sheath comprises a polyurethane coating for reduction of static build up and provision of impact protection for workpieces.

18. The portable adjustable conveyor of claim 1, wherein each base plate is a shape of a square, or a rectangle.

* * * * *